June 20, 1939. W. GARRISON 2,162,946
PLAYING CARD
Filed Aug. 5, 1937 4 Sheets-Sheet 1

Wilbert Garrison
By Geo C Wheelock
his Atty.

June 20, 1939.  W. GARRISON  2,162,946
PLAYING CARD
Filed Aug. 5, 1937   4 Sheets-Sheet 2

Wilbert Garrison
By Geo. Wheelock
his Atty.

June 20, 1939. W. GARRISON 2,162,946
PLAYING CARD
Filed Aug. 5, 1937 4 Sheets-Sheet 3

Wilbert Garrison
By Geo. Wheelock
his Atty

June 20, 1939. W. GARRISON 2,162,946
PLAYING CARD
Filed Aug. 5, 1937 4 Sheets-Sheet 4

Wilbert Garrison
By Geo. L. Wheelock
his Atty.

Patented June 20, 1939

2,162,946

UNITED STATES PATENT OFFICE 2,162,946

PLAYING CARD

Wilbert Garrison, New York, N. Y.

Application August 5, 1937, Serial No. 157,455

7 Claims. (Cl. 273—152)

The invention resides in a pack of playing cards comprising a plurality of differently illustrated cards which may be of similar size to the usual playing cards.

An object of the games which may be played by the cards is to illustrate that all kinds of life are maintained directly or indirectly through another form of nature or through the employment of different objects or articles. It is planned to divert the mind without requiring that intensity of thought which occurs in games which are played with many other kinds of playing cards in general use. Uncertainty gives the inexperienced an equal opportunity in games played by these playing cards. Many who like card diversion prefer not to make pleasure an effort and will be agreeably surprised in playing with these cards. The player wins by chance, and there is much humor and amusement in the games which may be played.

Also, an object of the improved playing cards is to indicate existence by the use of plural sets of cards which are suitably illustrated or bear suitable symbols. The cards can be matched or used in multiples in a manner to suit the pleasure of a player as in solitaire, or by two or more players as desired. Methods of play may be improvised, and not only may games be played which are amusing to grown-ups, but at least some of the games which may be played are ideal for very young children.

The above being among the objects of the present invention, the same consists of certain novel features to be hereinafter described and then claimed with reference to the accompanying drawings illustrating an embodiment of the invention and wherein Fig. 1 illustrates a set of six cards bearing suitable illustrations and indicia;

Figure 1:
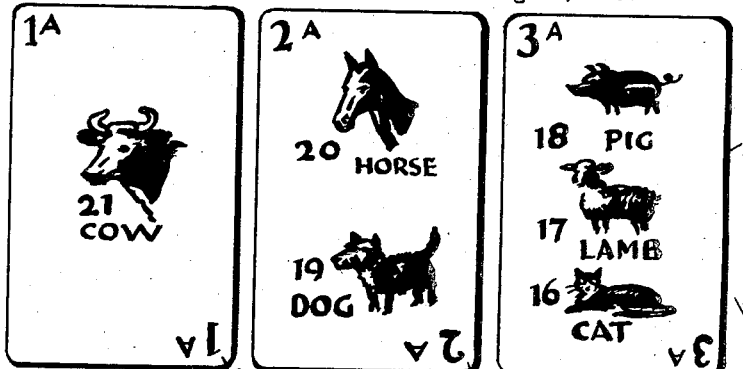
Figure 1:
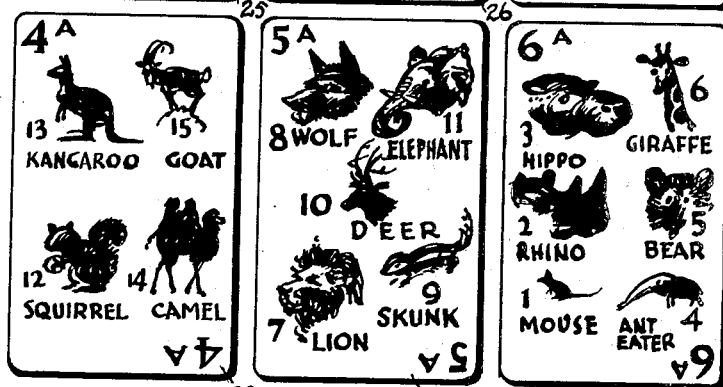

Now referring to Fig. 1, there is shown a set of six cards 25, 26, 27, 28, 29 and 30. Upon this set of cards there are printed twenty-one illustrations or pictures, and such illustrations will be characterized throughout the description as "symbols".

Card 25 bears a symbol to represent a cow, adjacent to which the card carries the numeral 21. Card 26 bears symbols to represent a horse and a dog which are adjacent to the numerals 20 and 19, respectively. Card 27 bears symbols to represent a pig, a lamb and a cat adjacent to which the card bears numerals 18, 17 and 16 to indicate the same, respectively. The card 28 bears symbols to represent a goat, camel, kangaroo and squirrel adjacent to which the card bears the respective numerals 15, 14, 13 and 12. Card 29 bears symbols to represent an elephant, a deer, a skunk, a wolf and a lion adjacent to which the card bears the respective numerals 11, 10, 9, 8, and 7. Card 30 bears symbols to represent a giraffe, a bear, an anteater, a hippopotamus, a rhinoceros and a mouse, adjacent to which the card bears the respective numerals 6, 5, 4, 3, 2 and 1.

Hence it will be seen that the set of cards shown in Fig. 1 bears the twenty-one illustrations described and each of which has its particular numeral directly there adjoining.

Figure 2:
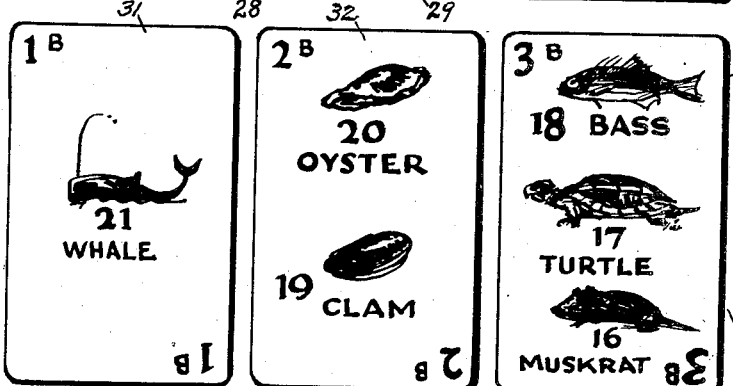
Fig. 2 is a similar view illustrating a second set of six cards.
Figure 2:
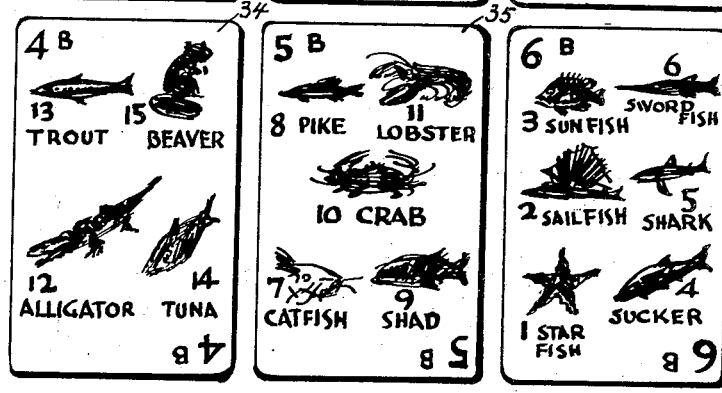

Referring to Fig. 2, which illustrates a second set of six cards, there are printed thereupon illustrations or symbols to represent the particular forms of marine life shown. This set includes the cards 31, 32, 33, 34, 35 and 36 bearing symbols different in appearance from those shown in Fig. 1. The number of symbols on this set increases from card 31 to card 36, in numerical progression from a minimum up to a maximum number as do the six cards 25 to 30 of the set shown in Fig. 1, although in the case of both sets the indicating numerals for the symbols of a set decrease in inverse progression to the number of symbols carried by the respective cards. That is to say, there is associated with the single symbol on card 25 or 31 the highest identifying numeral 21 and with the six symbols on card 30 or 36 the lowest identifying numerals 1 to 6; the highest numeral being of greatest value.

Figure 3:
Fig. 3 is a similar view illustrating a third set of six cards.
Figure 3:
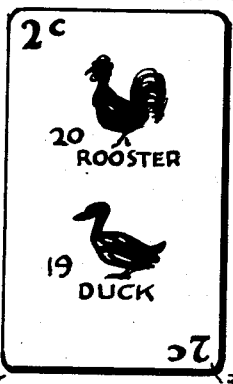
Figure 3:
Figure 3:
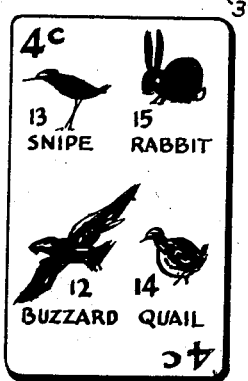
Figure 3:
Figure 3:
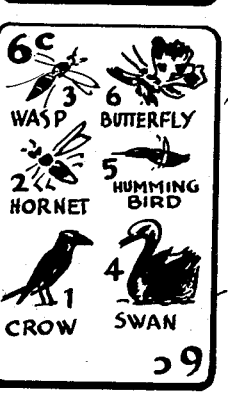
Figure 4:
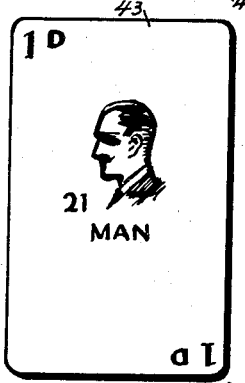
Fig. 4 is a similar view illustrating a fourth set of six cards.
Figure 4:
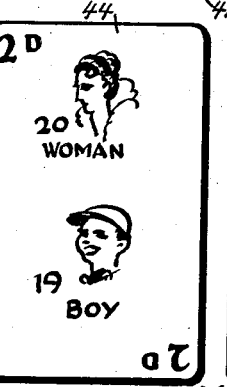
Figure 4:
Figure 4:
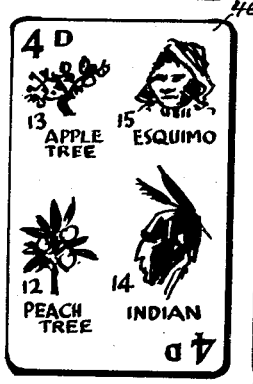
Figure 4:
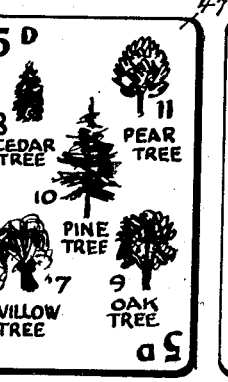
Figure 4:
Figures 5, 6:
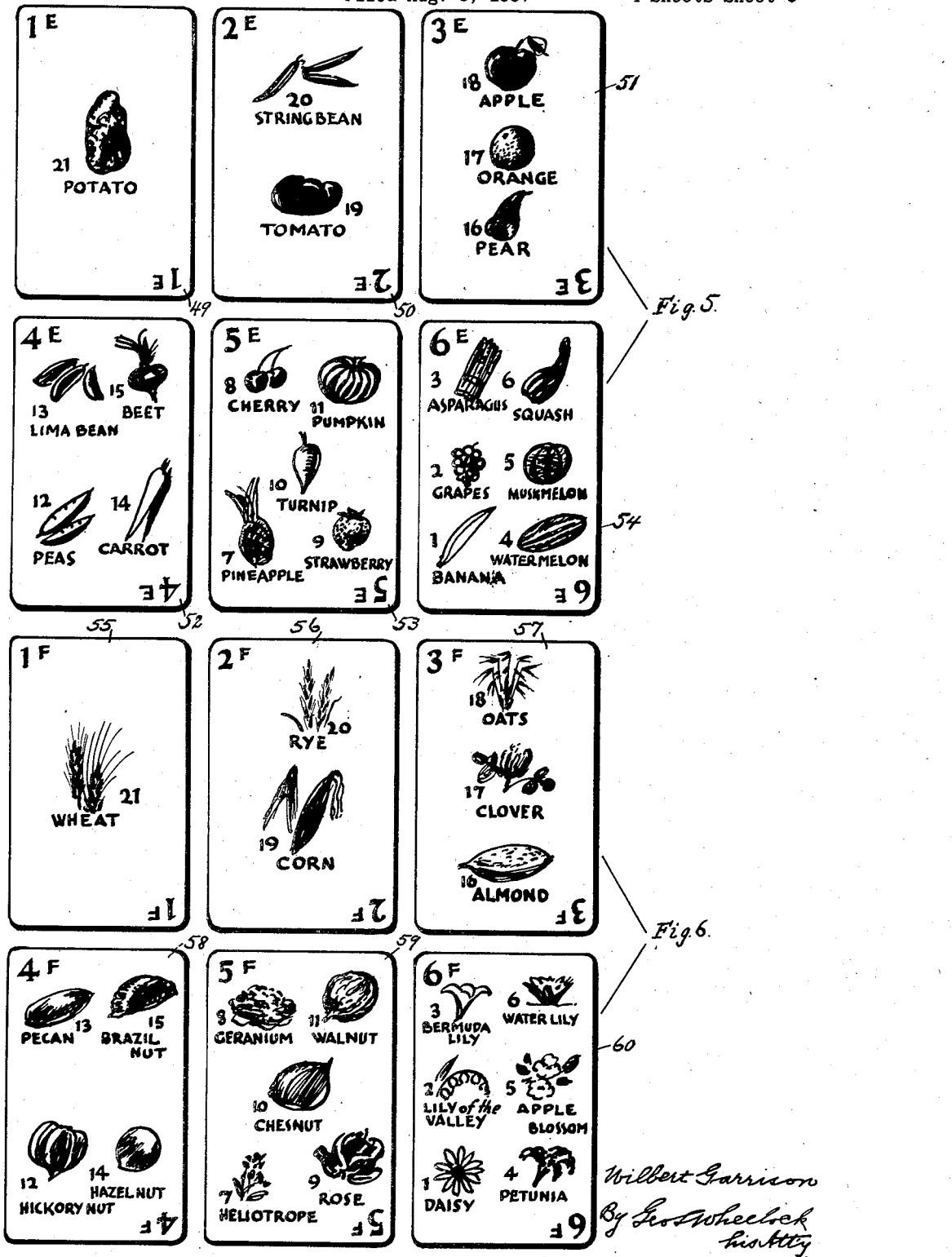
Fig. 5 is a similar view illustrating a fifth set of six cards.
Fig. 6 is a similar view illustrating a sixth set of six cards.
Figure 7:
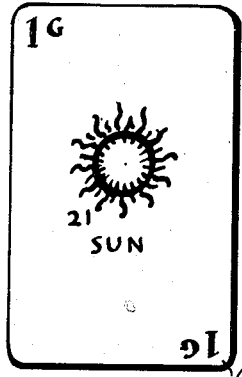
Fig. 7 is a similar view illustrating a seventh set of six cards.
Figure 7:
Figure 7:
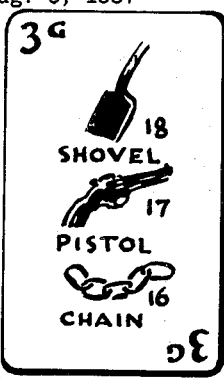
Figure 7:
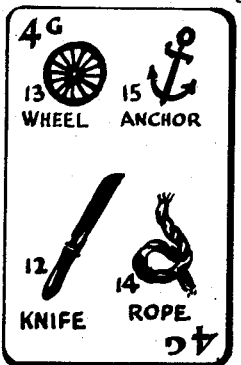
Figure 7:
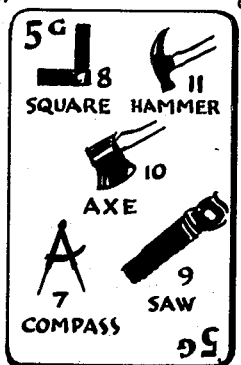
Figure 7:
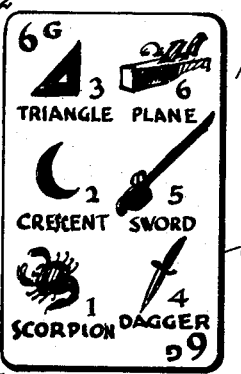
Figure 8:
Fig. 8 is a similar view illustrating an eighth set of six cards.
Figure 8:
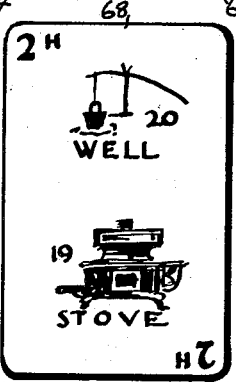
Figure 8:
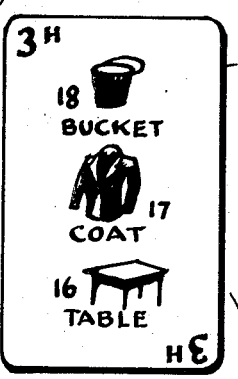
Figure 8:
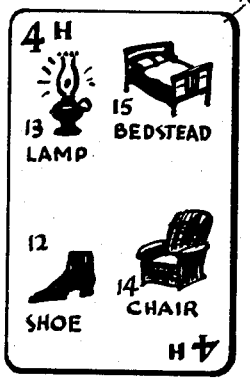
Figure 8:
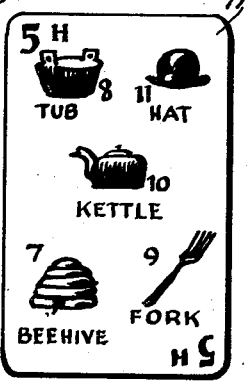
Figure 8:
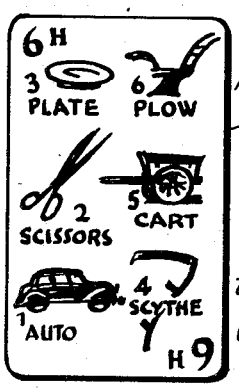

In Fig. 3 the third set of six cards carries symbols different from those shown in Figs. 1 and 2 and the arrangement of the symbols and the adjunct numerals therefor is the same on this set as on the other two sets. This set comprises cards 37, 38, 39, 40, 41 and 42. In Fig. 4 the fourth set of six cards is shown as comprising cards 43, 44, 45, 46, 47 and 48, and the number of symbols and the numeral for each symbol are carried out in the same way as the other described sets. In this fourth set the illustrations or symbols are somewhat more diversified than with respect to the described three sets, illustrating that the scheme in view may be diversified. The six cards 49, 50, 51, 52, 53 and 54 of the set shown in Fig. 5, the six cards 55, 56, 57, 58, 59 and 60 of the set shown in Fig. 6, the six cards 61, 62, 63, 64, 65 and 66 of the set shown in Fig. 7, and the six cards 67, 68, 69, 70, 71 and 72 of the set in Fig. 8 carry out for each set the same idea of symbols and identifying numerals as does each of the other sets more particularly described. Hence a particular description of the different symbols of the cards of each set other than the set shown in Fig. 1, and a particular description of the symbols of the different sets is unnecessary, as the symbols speak for themselves, the difference in appearance as shown by the drawings being deemed to be sufficient.

It will be seen that the sum of the number of symbols on each set of cards illustrated is equal to the sum of the number of symbols on the cards of any other set, so that the scheme for all of the sets corresponds.

Each of the eight sets of cards are shown to be printed with the name of the particular illustration or symbol depicted, although it may be preferred to omit the names from the cards for playing most kinds of games.

Each card of each of the eight sets may bear for reference purposes a corner numeral or indicia as shown running from the numeral 1 to the numeral 6, so as to indicate the number of cards belonging to each set as well as corresponding to the number of symbols on the card. Also adjacent to such reference numerals there may be shown a letter or indicia to indicate the particular set, that is, the eight sets shown, respectively bear the letters A, B, C, D, E, F, G, and H in the corners adjoining the said numerals, but sub-numbers such as 1 to 8 may be substiuted or any other letters or numerals may be substituted. Of course the corner numerals and indicia may be placed on diagonally opposite corners of each card if desired, and which arrangement is shown in the drawings.

Although a number of games may be played in a different manner by the illustrated and described playing cards; for enabling a better unstanding of the scheme which applies to the cards only one of the possible games will be explained.

When there are contestants, the cards are shuffled, cut and dealt. The dealer exposes his top card and makes a demand by indicatng a single picture thereon. The other players look at their cards and having a card with a picture thereon bearing relationship, edible or usable by the picture indicated, each must hand it to the dealer, who holds them aside with the card which he exposed, until the pack is exhausted. If a player has more than one card which would fulfill the requirement, only one card is passed over. Except those laid aside, the cards pass to the player to the left to be shuffled and dealt likewise for the next exposure and treatment. Fulfillment of a demand can be made with any card which consistently fulfills the rcquest. For example, and referring to the set illustrated in Fig. 4: If card 43 picturing a man is exposed, each other player can hand over most any card since a man could use nearly everything pictured on all the other cards. Another illustration is card 48 of Fig. 4, bearing pictures or symbols with indicia as follows: 1 a beetle; 2 a lizard; 3 an ant; 4 a spider; 5 a snake, and 6 an earthworm. When this card is exposed, one of the six pictures or symbols thereon must be indicated and the other players must pass the dealer a card picturing something related to or usable by the indicated picture, namely: beetle 1 can eat vegetables and fruit, live in trees, etc., but if the earthworm 6 is indicated and has no apparent complementary card to fulfill its purpose, no cards would be passed. Scores are computed when pack is exhausted, by computing each player's laid aside cards by total value of symbols, or total symbols as agreed.

It is obvious that the invention shown and described may be subject to more or less modification without departing from the scope of the appended claims.

What I claim as new is:

1. A pack of playing cards, comprising a plurality of sets of cards containing the same number of cards in each set, the number assigned to each of the cards contained in each set being indicated on the separate cards thereof in numerical sequence throughout the set beginning with number 1, the highest assigned number indicating how many cards are in the set, and each set bearing additional numerical indicia in their fields in sequence beginning with number 1 and progressing numerically through the set inversely to the progression of the said assigned numbers on the cards of the set, the card of each set with the highest assigned number bearing number 1 of said additional inversely progressing numerical indicia and other of such inversely progressing numerical indicia to correspond in quantity to that indicated by the number assigned to said card, and so on through the cards of each set so that each number-assigned card of each set bears such inversely progressing numerical indicia in a quantity equaling that indicated by the number assigned to the particular card of the set, whereby the card bearing the lowest assigned number will bear the highest one of the inversely progressing numerical indicia.

2. A pack of playing cards, comprising a plurality of sets of cards containing the same number of cards in each set, the number assigned to each of the cards contained in each set being indicated on the separate cards thereof in numerical sequence throughout the set beginning with number 1, the highest assigned number indicating how many cards are in the set, and all of the card of each set bearing other assigned indicia distinguishing each set separately from any other set in the pack, and each set bearing additional numerical indicia in their fields in sequence beginning with number 1 and progressing numerically through the set inversely to the progression of the said assigned numbers on the cards of the set, the card of each set with the highest assigned number bearing number 1 of said additional inversely progressive numerical indicia and other of such inversely progressing numerical indicia to correspond in quantity to that indicated by the number assigned to said card, and so on through the cards of each set so that each number-assigned card of each set bears such inversely progressing numerical indicia in a quantity equaling that indicated by the number assigned to the particular card of the set, whereby the card bearing the lowest assigned number will bear the highest one of the inversely progressing numerical indicia.

3. A pack of playing cards, comprising a plurality of sets of cards, each set containing the same number of cards as any other set, and each card of each set bearing symbols having characteristics different from those of the symbols on any other card in that set, and the cards of each set bearing in succession such different symbols in numerical progression from a minimum up to a maximum number of symbols throughout the set, so that each card of each set will bear a different quantity of such symbols from any other card of the set, and each set of cards of the plurality having its said numerically progressive diverse symbols of different characteristics from the symbols on any of the cards of any other set of cards, and the sum of the number of said numerically progressive diverse symbols throughout each set of cards being equal to the sum of the number of symbols on the cards of any other set.

4. A pack of playing cards, comprising a plurality of sets of cards, each set containing the same number of cards as any other set, and each of the cards of each set bearing other assingned teristics different from those of the symbols on any other card in that set, and the cards of each set bearing in succession such different symbols in numerical progression from a minimum up to a maximum number of symbols throughout the set, so that each card of each set will bear a different quantity of such symbols from any other card of the set, and each set of cards of the plurality having its said numerically progressive diverse symbols of different characteristics from the symbols on any of the cards of any other set of cards, and corresponding indicia on the cards of each set to distinguish that set from the cards of any other set which bear other corresponding indicia of another character, and numerical indicia on the cards of each set to show the number of cards thereof and the number of such symbols on each card of the set, the least of said numerical indicia being on that card of each set bearing the least number of such symbols, and said numerical indicia progressing from that card to the card of the set bearing a maximum number of such symbols.

5. A pack of playing cards, comprising a plurality of sets of cards, each set containing the same number of cards as any other set, and each card of each set bearing pictures having characteristics different from those of the pictures on any other card in that set, and the cards of each set bearing in succession such different pictures in numerical progression from a minimum up to a maximum number of pictures throughout the set, whereby each card of each set bears a different quantity of pictures than any other card of the set, and each set of cards of the plurality having its said numerically progressive diverse pictures throughout the set of different characteristics from the pictures on any of the cards of any other set of cards.

6. A pack of playing cards, comprising a plurality of sets of cards, each set containing the same number of cards as any other set, and each card of each set bearing symbols having characteristics different from those of the symbols on any other card in that set, and the cards of each set bearing in succession such different symbols in numerical progression from a minimum up to a maximum number of symbols throughout the set, so that each card of each set will bear a different quantity of such symbols from any other card of the set, and each set of cards of the plurality having its said numerically progressive diverse symbols of different characteristics from the symbols on any of the cards of any other set of cards, and each set bearing indicia for each of its said symbols decreasing in value from the card bearing the least number of such symbols to the card bearing the highest number of such symbols, so that the said indicia on the cards of each set decreases in value in inverse progression to the number of symbols thereon.

7. A pack of playing cards, comprising a plurality of sets of cards, each set containing the same number of cards as any other set, and each card of each set bearing sysmbols having characteristics different from those of the symbols on any other card in that set, and the cards of each set bearing in succession such different symbols in numerical progression from a minimum up to a maximum number of symbols throughout the set, so that each card of each set will bear a different quantity of such symbols from any other card of the set, and each set of cards of the plurality having its said numerically progressive diverse symbols of different characteristics from the symbols on any of the cards of any other set of cards and the cards of each set bearing indicia associated with each of the said different symbols throughout the set to indicate separately the different values of the said symbols, the indicia of greatest value being on the card of the set bearing a minimum number of such symbols and the indicia of least value being on the card having a maximum number of such symbols.

WILBERT GARRISON.

CERTIFICATE OF CORRECTION.

Patent No. 2,162,946.                                              June 20, 1939.

WILBERT GARRISON.

It is hereby certified that error appears in the printed specification of the above numbered patent requiring correction as follows: Page 3, first column, lines 20 and 21, strike out "of the cards of each set bearing other assingned teristics" and insert instead the words card of each set bearing symbols having characteristics; and that the said Letters Patent should be read with this correction therein that the same may conform to the record of the case in the Patent Office.

Signed and sealed this 8th day of August, A. D. 1939.

(Seal)
Leslie Frazer,
Acting Commissioner of Patents.